Aug. 16, 1966  H. SVANOE  3,266,264
SALINE WATER CONVERSION
Original Filed July 19, 1960
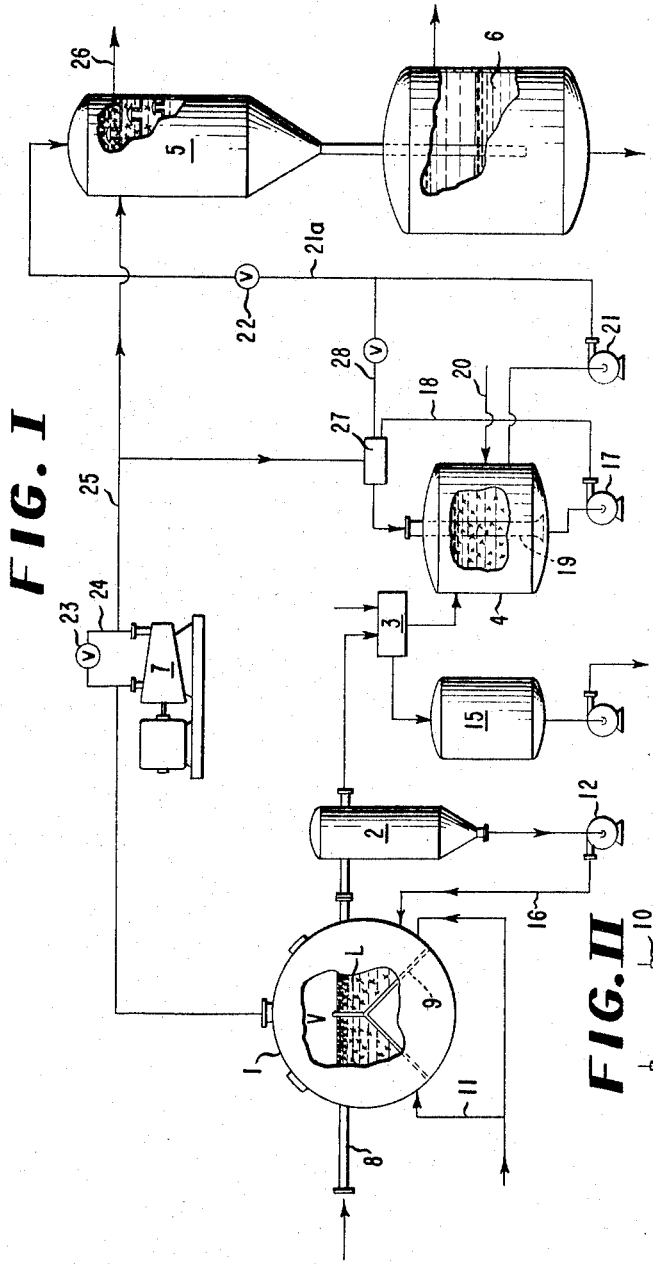
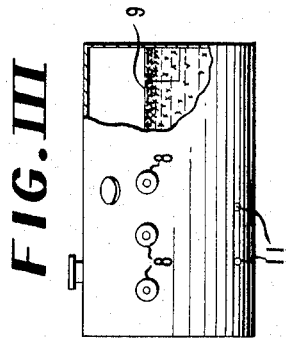
INVENTOR
HANS SVANOE
BY  *Sidney G. Klein*
AGENT Patented August 16, 1966

3,266,264
SALINE WATER CONVERSION
Hans Svanoe, North Warren, Pa., assignor, by mesne assignments, to Struthers Scientific and International Corporation, New York, N.Y., a corporation of Delaware
Continuation of application Ser. No. 43,827, July 19, 1960. This application July 21, 1965, Ser. No. 473,609
4 Claims. (Cl. 62—123)

This application is a continuation of my co-pending application Serial No. 43,827, filed July 19, 1960, and entitled "Saline Water Conversion," the subject matter of which co-pending application is based in part upon application Serial No. 794,664, filed February 20, 1959, and now U.S. Patent 3,098,734.

This invention relates to a process for saline water conversion and is more particularly related to such a process in which ice is removed from saline water by freezing and adhering mother liquor removed from the ice.

The treatment of sea water, for purification to brine-free water by freezing is based on the well known observation that ice, frozen from a salt solution and separated from the brine mother liquor is reduced in salt content. The degree of reduction is a measure of the efficacy of the process used. Water, however, freezes in multifarious crystal forms many of which are so intricately shaped that they tenaciously hold mother liquor and prevent conversion to water with a salt content sufficiently low for many uses. Ice crystals likewise have a tendency to coalesce or agglomerate thus further increasing separation difficulties and the removal of brine mother liquor from the crystals and especially that which has been trapped by the coalesced crystals. The invention provides a process of freezing saline water wherein ice crystals having a compact shape are formed as discrete granules from which mother liquor can be readily and economically separated and a substantially brine free potable water prepared.

Objects of the invention include a process for converting saline water to fresh water; for controlling the crystal size of the ice produced; for efficiently utilizing a refrigerant in direct heat exchange relationship with the saline water; for improving the initial contact of the refrigerant and the saline water; for producing a granular ice product; for maintaining an environment in which the aforesaid and other objects of the invention are effected. Other objects and advantages of the invention will hereinafter appear.

The invention will be more readily understood by reference to the drawing in which like parts have like numbers throughout.

FIGURE I illustrates diagrammatically equipment used in a process in which saline water is converted by freezing to potable water. This drawing constitutes a flow sheet of the course of the brine, ice and refrigerant through the process. FIGURES II and III show diagrammatically details of the crystallization vessel, in which ice is formed by evaporation of a suitable refrigerant, and the means used for introducing the refrigerant into that vessel.

The saline water, sea-water or other brine containing liquid, is subjected to evaporative-crystallization with a suitable refrigerant in crystallizer 1, the ice-brine slurry is thickened in decanter 2, the ice separated from the brine in centrifuge 3 and after fluidization (of ice and liquid refrigerant and/or ice, liquid refrigerant and water) in tank 4, or otherwise treated as described below, the water (as ice) now reduced in salt content is separated from refrigerant in the condenser 5 and separator 6. Vapors of the refrigerant are drawn by compressor 7 from the crystallizer 1 compressed and passed into condenser 5 for liquefaction.

More specifically the process of the invention is conducted by passing saline water, and more specifically a sea water, pre-cooled, by any suitable means not shown, to about 32° F. into the crystallizer 1 through one and preferably a plurality of inlets 8 (cf. also FIGS. II and III). The crystallizer 1 is provided with a central baffle 9, the latter having in cross section the shape of an inverted Y, the divided section of the Y extending to the ends of crystallizer 1, the single section of the Y extending through the mid-portion of the crystallizer leaving a space at both ends for the flow of liquid. Propellers 10 or other suitable devices are provided to give a turbulent and circular flow of the liquid around the chamber liquid space L provided by the enclosed space between the extended Y-shaped baffle 9 and the walls of the crystallizer 1. Saline water fills the chamber with little or no flow of liquid over the top of the baffle 9. A refrigerant in the liquid phase, and under suitable pressure and temperature to attain that phase, under the hydraulic head of the saline water, is introduced through inlets 11 into the liquid space L and preferably into the constricted space confined between the lower extremities of baffle 9 and the walls of the crystallizer.

The refrigerant as it is introduced into the liquid in space L is introduced with a suitable pressure in excess of that superimposed by the hydraulic head of saline water in space L. Droplets of the refrigerant are formed as the refrigerant passes from inlets (which may be in the form of a suitable nozzle not shown), into the liquid circulating in space L. The refrigerant evaporates as the droplets rise up and pass through the saline water and cool the water to give a slurry ice-brine mother liquor. The circulation induced by the propellers 10 and the injection of the saline water and refrigerant, the shape of the crystallizers 1 and the upflow of refrigerant, inter alia, form a turbulent suspension of refrigerant droplets in the liquid space L which will be more fully characterized hereinafter.

From the liquid space L of crystallizer 1 an ice-mother liquor slurry is withdrawn by pump 12 into a slurry thickener tank 2. In tank 2 a partial separation of brine, mother liquor from ice is effected, the mother liquor being returned through line 16 to crystallizer 1 and the partially mother-liquor-free ice is charged to centrifuge 3 (which is continuously or intermittently operated). The mother liquor separated from the ice in centrifuge 3 is passed to the mother liquor tank 15 and then to waste after heat exchange with raw saline water or other suitable utilization of its low heat content.

The ice continuously or intermittently discharged from centrifuge 3 is dispersed in fluidizer tank 4 preferably with the liquid refrigerant by means of circulation provided by pump 17 circulating line 18 and suitable devices such as pipe 19. Liquid refrigerant and/or water at or slightly above ice temperature is fed by line 20 into tank 4 in suitable amounts to give a dispersion of the ice crystals. The slurry from tank 4 is transferred by pump 21 and line 21a to the top of condenser 5.

The ice and slurry from tank 4 condenses the compressed refrigerant from compressor 7 in condenser 5, the liquification melting the ice, and the liquid refrigerant and resulting water passed to decanter 6 wherein the liquid refrigerant and water are separated, the refrigerant being returned to storage under suitable temperature and pressure to maintain its temperature and liquid phase state and the water, after heat exchange to utilize its reduced specific heat content, sent to product storage, not shown.

More specifically the conversion is carried out by introducing the saline water at a temperature below 10° C., preferably about 0° C. into crystallizer 1. A liquid refrigerant such as butene or other suitable refrigerant is also introduced under a pressure and in such amounts that a 22 percent to 32 percent over-all yield of ice is produced. Such a yield involves the use of a definite ratio of refrigerant to saline water in the crystallizer. This ratio is so adjusted that the specific gravity of the saline water and refrigerant is such that the ice will be suspended. The saline water (brine mother liquor) and refrigerant will, therefore, have a combined or apparent specific gravity close to 1.00 at 0° C. or below. Apparent specific gravity as used herein is the average specific gravity of the brine-ice-refrigerant (liquid and vapor) in the crystallization zone L. As a consequence the ice particles will tumble through the mother-liquor refrigerant environment impelled by propellers 10, the flow of the slurry in liquid space L and the rise of the refrigerant as it flows up through the slurry giving up its latent heat of evaporation as the initial droplets of refrigerant pass from a liquid to a vapor phase. Efficient operation of the process is dependent to a large extent on maintenance of the dispersion of the ice in the liquid space L.

A severe problem solved by the process of this invention is avoidance of agglomeration of ice particles into masses of particles that hold so tenaciously to brine mother liquor that it cannot be efficiently washed from the ice. This avoidance is accomplished inter alia by forming large granular ice crystals, in the order of 0.4 to 1.5 mm., in diameter on the $a$ axis and at least 0.1 mm. of the $c$ axis (ice crystals form in the hexagonal system with three $a$ axes and the $c$ axes at 90° to the $a$ axis). Such crystals are formed by conducting their formation in a spacially and temporally constant environment with respect to temperature held below 0° C. with a variation of less than 1° C. (and preferably less than about 0.3° C. brine temperature difference), a pressure in the vapor space V of 0.5 p.s.i. to 4 p.s.i. with a variation of less than about 1 p.s.i. for butene, at any desired operating condition, and for other refrigerants a vapor pressure, in space V corresponding to a brine temperature described above, and with a weight ratio of introduced saline water to introduced brine or mother liquor of between 1:1 and 1:4 and preferably between 1:2 and 1:3.

The process of the invention is operated with a ratio of refrigerant to brine and refrigerant pressure adjusted for sufficient evaporation and refrigeration to produce from 2 to 12 pounds and preferably 4 to 8 pounds of ice per hour per gallon of total brine subjected to refrigeration. When so operated, under the aforesaid conditions, and especially under substantially constant environmental conditions, continuous crystallization with little or no outage time results in efficient low cost per gallonage of water produced.

Operation of the crystallizer as thus described will produce a crystal crop that can be separated from the mother liquor by filtration or by centrifuging without agglomeration. The ice crystals coming into contact with each other, during crystallization, filtration, or separation by centrifuging or other suitable separation method, are all of about the same temperature. It has been found that when crystals contact other crystals being of a different temperature, crystal clusters form, which defeat the efficient removal of the occluded mother liquor. When the crystals are washed in a centrifuge or filter, care should be exercised that the wash water, or other washing liquid, does not produce a temperature gradient in the crystals for any appreciable length of time. A possible danger of crystal agglomeration is thus here avoided.

Fluidizer tank 4 is operated to further avoid agglomeration, and to fluidize the ice from centrifuge 3 in the liquid refrigerant and/or water used. Control of fluidization, and control by valve 22 of the amount of fluidized ice to transmitted condenser 5, result in efficient operation of latter. Such operation provides condensation of the refrigerant vapor to liqjuid phase; and at the same time, conversion of the ice to water.

Any refrigerant having a specific gravity, preferably below 1.00 at 20° C., a suitably high latent heat of evaporation in crystallizing ice from sea water under the temperature and pressure of the process of the invention may be used. The preferred refrigerants are liquids, at absolute pressures above 300 mm. of Hg at the temperature of crystallization in crystallizer 1, and that are relatively insoluble in water at around 0° C. i.e. a solubility of less than about 0.5 gr./100 grs. of water. Examples of suitable refrigerants for this purpose are the alkyl halides e.g. ethyl chloride, butyl chloride, and the other low specific gravity, relatively low boiling hydrocarbon halides. The low boiling saturated and unsaturated hydrocarbons such as normal and iso-propane, normal and iso-butane, the butenes and equivalent readily liquifiably hydrocarbons are preferred.

Temperature of the crystallization in the liquid space L is maintained by the vapor pressure of the refrigerant in the vapor space V above the circulating slurry. More specifically, control of the temperature by the pressure is accomplished by the pressure control of compressor 7 which is preferably operated by a variable speed prime mover used in conjunction with the by-pass valve 23 in line 24. Condensation of the refrigerant vapors in the condenser 5 results in a pressure drop. Due regulation of the compressor with the by-pass valve 23 afford a precise means of controlling the degree and constancy of the temperature in the crystallizer 1.

Condenser 5 which is a barometric condenser is provided with any suitable slurry hold-up device well known in the art for providing contact of crystals with liquors and vapors. Those shown in the drawing are exemplary and for purposes of illustration. Uncondensed refrigerant is withdrawn from condenser 5 through line 26 to a secondary compressor and condenser system for recovery. Separator 6 effects by decantation the separation of the refrigerant from the water. If the refrigerant has a specific gravity above 1.00 it, of course, will be withdrawn from the lower layer and the water from the upper layer of the separator 6 and vice versa.

A critical feature of the process is the control of crystallization in space L. The nuclei, and the growing crystals should at all times be held in a turbulent environment and as discrete entities out of contact with surrounding crystals. The yield of crystals, therefore, is adjusted and arranged by the ratio of refrigerant to saline water introduced and the pressure in space V to insure that ample circulation of crystals, in the sense of rapid motion, in the mother liquor should be present with no undue accumulation of a thickened ice-mother liquor layer in space L above the amount that can be withdrawn to thickener 2 and will permit free and substantial movement of the crystals especially in space L below the thickened ice-mother liquor layer. This result is obtained by the formation of droplets of the refrigerant e.g. butene as they are introduced into the constricted section of the crystallizer 1, these droplets swirl upward into the saline water, as they evaporate and refrigerate that water. The ice crystals as they grow are compelled by the droplets and the evaporation of the droplets together with the turbulence of the flowing and circulating slurry to maintain their individuality during crystallization and discharge from crystallizer 1. Nozzles should be provided with small openings to permit the formation of the droplets shortly after they are injected into space L.

The fluidization and/or dispersion of ice in tank 4 is facilitated by the addition of a moderate amount of heat to the circulating slurry in line 18 which may be accomplished by any suitable means such for example as by heat exchange in heater 27 with refrigerant from line 25, the refrigerant then passing through line 28 to line 21a and condenser 5.

If desired some washing of mother liquor can be effected by spraying the crystals in centrifuge 3 with liquid refrigerant and/or saline water with a reduced salt content. A part of the mother liquor can be added to the system as wash water or as a spray to lower the brine concentration in surface contact with the ice. In carrying out this operation the admonitions stated previously regarding avoidance of agglomeration of ice particles should be carefully noted.

The chamber of crystallizer 1, and the baffle 9, may each be modified in shape, as long as the desired structural and functional inter-relationship between the two is maintained. Thus, the baffle 9 should serve to set off within the chamber a liquid space L. The baffle 9 should also provide at least one leg portion projecting angularly with respect to a wall surface portion of the chamber. Each such leg portion, at its outer extremity, should be in abutment with the chamber wall surface portion. Each leg portion, adjacent its outer extremity, and in cooperation with the chamber wall surface portion, will serve to provide a comparatively constricted path of flow of refrigerant into the liquid space L.

The baffle 9, though of modified shape, may provide a further leg portion projecting in a direction away from the wall surface portion, and into the liquid space. Such further leg portion would be dimensioned for flow therearound of liquid being treated in the liquid space.

Although the invention has been described with reference to particular embodiments thereof, it will be realized that various changes and modifications may be made therein without departing from the spirit of the invention or the scope of the appended claims.

I claim:
1. Crystallization apparatus, comprising:
 (a) means defining a crystallization chamber;
 (b) a baffle within said chamber and providing at least one leg portion projecting angularly with respect to a wall surface portion of said chamber, each leg portion at its outer extremity being in abutment with said wall surface portion, said baffle serving to set off within said chamber a liquid space adapted to contain solution to be treated;
 (c) means for maintaining turbulent flow of liquid in said liquid space; and
 (d) means for the introduction of vaporizable liquid refrigerant into said liquid space and adjacent the outer extremity of each leg portion, each of said leg portions, adjacent its outer extremity, and in cooperation with said wall surface, being adapted to provide a comparatively constricted path of flow of refrigerant into said liquid space, said chamber providing a vapor space adapted to receive vaporized refrigerant.

2. Crystallization apparatus according to claim 1, said baffle further providing an additional leg portion projecting in a direction away from said wall surface portion, and into said liquid space, said additional leg portion being adapted for flow therearound of liquid in said liquid space.

3. Crystallization apparatus comprising:
 (a) means defining a crystallization chamber;
 (b) a baffle within said chamber and providing two mutually divergent leg portions, each leg portion projecting angularly with respect to a wall surface portion of said chamber, said leg portions at their respective outer extremities being in abutment with said wall surface portion, said baffle serving to set off from said wall surface portion a liquid space located within said chamber and adapted to contain solution to be treated;
 (c) means for maintaining turbulent conditions in said liquid space;
 (d) means for the introduction of vaporizable liquid refrigerant into said liquid space and adjacent the outer extremity of at least one of said leg portions, each of said leg portions, adjacent its outer extremity, and in cooperation with said wall surface, being adapted to provide a comparatively constricted path of flow of refrigerant into said liquid space, said chamber providing a vapor space adapted to receive vaporized refrigerant.

4. Crystallization apparatus comprising:
 (a) means defining a cylindrical crystallization chamber, said chamber being adapted for positioning with the axis thereof lying substantially horizontally;
 (b) a baffle within said chamber and providing two mutually divergent and downwardly projecting leg portions, said leg portions at their respective outer extremities being in abutment with a wall surface of said chamber, said leg portions extending axially the full length of said chamber, said baffle serving to set off from said wall surface portion a liquid space located within said chamber and adapted to contain solution to be treated, said baffle further providing a third leg portion adapted to project upwardly through at least part of said liquid space, said third leg portion extending axially through a central section of said chamber;
 (c) means for maintaining turbulent movement of liquid in said liquid space and around said third leg portion; and
 (d) means for the introduction of vaporizable liquid refrigerant into said liquid space and adjacent the outer extremity of at least one of said leg portions, each of said leg portions adjacent its outer extremity and in cooperation with said inner wall surface, being adapted to provide a comparatively constricted path of flow of refrigerant into said liquid space, said chamber providing a vapor space adapted to receive vaporized refrigerant.

References Cited by the Examiner
UNITED STATES PATENTS

| | | | |
|---|---|---|---|
| 2,896,419 | 7/1959 | Thompson | 62—58 |
| 3,150,499 | 9/1964 | Margiloft | 62—123 |
| 3,155,459 | 11/1964 | Brown et al. | 62—58 |

NORMAN YUDKOFF, *Primary Examiner.*

G. P. HINES, *Assistant Examiner.*